Oct. 11, 1927.
E. R. THOMAS
COMBINATION CLAMP
Filed July 27, 1926
1,645,463
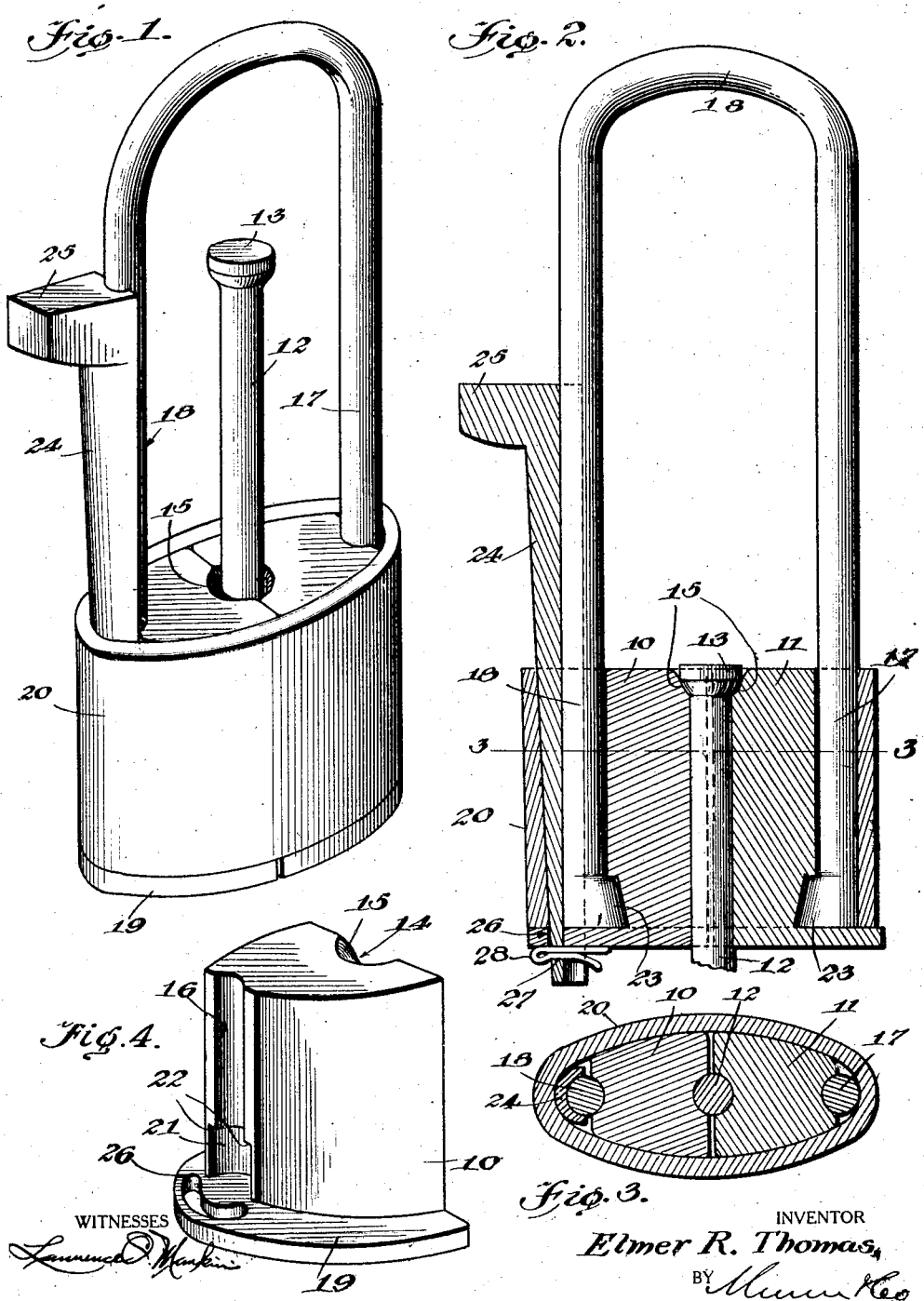
WITNESSES
INVENTOR
Elmer R. Thomas,
BY
ATTORNEYS

Patented Oct. 11, 1927.

1,645,463

UNITED STATES PATENT OFFICE.

ELMER R. THOMAS, OF SHIDLER, OKLAHOMA, ASSIGNOR OF ONE-HALF TO VICTOR HARRIS, OF SHIDLER, OKLAHOMA.

COMBINATION CLAMP.

Application filed July 27, 1926. Serial No. 125,305.

My present invention relates generally to clamps, and more particularly to a combination clamp as used in oil well pumping equipment designed to embody means for clamping an iron rod and including a stirrup for engagement by connections for actuating the rod so clamped, and my primary object is the provision of an arrangement capable of ready assembly and disassembly in which the clamping members not only act to effectively engage and hold in connection with an iron rod, but also serve at the same time to clamp the extensions of the stirrup.

In the accompanying drawing which illustrates my present invention and forms a part of this specification:

Figure 1 is a perspective view showing the clamp complete, the wedge being partly withdrawn.

Figure 2 is a vertical section taken therethrough showing the clamp complete in connection with an iron rod and with the wedge in effective position;

Figure 3 is a transverse sectional view taken substantially on line 3—3 of Fig. 2, and, Figure 4 is a detailed perspective view of one of the clamping members.

Referring now to these figures, my invention proposes a combination clamp including a pair of complementary clamping members 10 and 11, having their abutting faces substantially flat and provided with grooves forming a bore to receive an iron rod 12, which it is the purpose of the clamping members to effectively engage. In practice the iron rod 12 is headed as at 13 and the clamping members are provided at their upper ends of their complementary grooves 14 with cut out portions 15 forming a socket adapted to receive the rod head 13.

The clamping members 10 and 11 are provided at their outer sides opposite to their abutting faces with grooves 16, to receive the extensions 17 of a stirrup 18, and the clamping members are further provided with flanges 19 at their lower ends or bases upon which the lower edge of a clamping band 20 is adapted to seat. This band is preferably of the oval shape shown, and the clamping members are contoured to interfit the band as particularly shown in Figs. 1 and 3.

Adjacent to their base flanges 19 the clamping members have their outer side grooves 16 provided with enlarged sockets 21, forming shoulders 22 at one end thereof between the same and the grooves 16. These sockets receive the enlarged shouldered extremities 23 of the stirrup extensions 17, so that after placing the clamping members 10 and 11 against one another around the rod 12 to be clamped, the stirrup extensions may be placed in the grooves 16 with their enlarged extremities 23 in the sockets 21. Thereupon the clamping band 20 is slipped over the stirrup and around the clamping members 10 and 11 until one edge thereof engages the base flanges 19 of the clamping members so as to confine the latter against displacement and also hold the stirrup in place.

The clamp is then completed and very secure clamping of the iron rod 12 provided for by the use of a wedge 24 shaped to be forced through one side of the band 20 along one of the stirrup extensions 18, the wedge having a head 25 at one end by virtue of which it may be hammered or otherwise driven snugly into place. This wedge is adapted to extend not only through the band 20, but also at its free end through an arcuate slot 26, in a portion of the base flange 19 of one of the clamping members so that by providing the wedge with an opening 27 adjacent to its free end and in that portion thereof adapted in the effective position to extend through the opening 26 just above mentioned, a cotter pin 28 as shown in Fig. 2 may be extended through the opening 27, in order to lock the wedge against accidental displacement.

The wedge 24 as it is driven through the clamping band 20 surrounding the clamping members forces the clamping members laterally into close clamping contact with the iron rod 12 extending therebetween and at the same time securely wedges the clamping members in engagement with the stirrup extensions 18.

In this way the combination clamp as provided by my invention may be quickly assembled and disassembled without the use of special tools or equipment and in addition to this advantage my invention provides a construction which will be effective and efficient in its clamping action and which will be strong and durable in use.

I claim:

1. A combination clamp including a stirrup the extensions of which are provided with enlargements at their free ends, a pair of clamping members having their abutting faces formed with rod receiving grooves, and also having grooves in their outer faces and sockets at one end of the outer grooves, said grooves and sockets respectively receiving the extensions and the enlargements of the stirrup, a clamping band around the clamping members and the stirrup extensions, and a wedge member between the said band and one of the stirrup extensions whereby to force the clamping members laterally into clamping position.

2. A combination clamp including a stirrup the extensions of which are provided with enlargements at their free ends, a pair of clamping members having their abutting faces formed with rod receiving grooves, and also having grooves in their outer faces and sockets at one end of the outer grooves, said grooves and sockets respectively receiving the extensions and the enlargements of the stirrup, a clamping band around the clamping members and the stirrup extensions, a wedge member between the said band and one of the stirrup extensions whereby to force the clamping members laterally into clamping position, one of said clamping portions having a slot through which the smaller end of the wedge extends, said wedge end having an opening, and means extending through the opening to hold the wedge against accidental displacement.

3. A combination clamp including a pair of clamping members, a clamping band around the members and in which the clamping members are shiftable toward and away from one another, said clamping members having rod gripping faces in opposing relation and having grooves in their outer faces adjacent to the band, a stirrup having extensions projecting into said grooves, and wedging means extendable between the said band and a portion of the clamping members whereby to shift the latter into simultaneously clamping engagement with the said stirrup extensions, and a rod disposed between the members.

4. A combination clamp including a clamping band, a stirrup having extensions, clamping members within the band adapted to receive the stirrup extensions between the same and the band, the said clamping members adapted to receive a rod therebetween, and means cooperating with the clamping members and the band for simultaneously shifting the clamping members in the plane of the stirrup extensions and a rod therebetween to clampingly engage the stirrup extensions, and a rod therebetween.

ELMER ROS THOMAS.